United States Patent [19]

Masler et al.

[11] Patent Number: 4,925,072

[45] Date of Patent: May 15, 1990

[54] LOCKING MECHANISM FOR A PIVOTABLE CLOSURE

[75] Inventors: Gerhard Masler, Hemdingen; Uwe Harder, Hamburg, both of Fed. Rep. of Germany

[73] Assignee: ITW-Ateco GmbH, Norderstedt, Fed. Rep. of Germany

[21] Appl. No.: 144,239

[22] Filed: Jan. 15, 1988

[30] Foreign Application Priority Data

Jan. 15, 1987 [DE] Fed. Rep. of Germany ....... 3700961
May 15, 1987 [DE] Fed. Rep. of Germany ....... 3716288

[51] Int. Cl.$^5$ .............................................. B60R 7/00
[52] U.S. Cl. ..................... 224/282; 224/280; 224/281; 292/49; 292/DIG. 4; 296/37.9
[58] Field of Search ............ 224/282, 281, 280, 42.42; 292/DIG. 4, DIG. 7, DIG. 4, DIG. 38, 6, 45, 49, 91, 251.5; 70/144, 145; 358/254; 220/18; 131/231; 296/37.9; 200/314, 523, 525, 526

[56] References Cited

U.S. PATENT DOCUMENTS

| Re. 21,441 | 4/1940 | Visser | 224/280 |
|---|---|---|---|
| 2,196,648 | 4/1940 | Visser | 224/280 |
| 2,256,874 | 9/1941 | Visser | 224/280 |
| 2,311,968 | 2/1943 | Schallis | 224/280 |
| 2,330,417 | 9/1943 | Gillisse et al. | 224/280 |
| 2,398,936 | 4/1946 | Hendricks | 224/280 |
| 2,441,614 | 5/1948 | Baumer | 200/526 |
| 2,771,209 | 11/1956 | Flynn | 296/37.9 |
| 3,165,612 | 1/1965 | Bailey | 200/526 |
| 4,194,104 | 3/1980 | Stenta | 200/526 |
| 4,495,391 | 1/1985 | Kitao et al. | 200/526 |
| 4,709,949 | 12/1987 | Umezawa et al. | 292/DIG. 4 |

FOREIGN PATENT DOCUMENTS

| 2538053 | 6/1984 | France | 296/37.9 |
|---|---|---|---|
| 2549123 | 1/1985 | France | 296/37.9 |
| 0218131 | 11/1985 | Japan | 296/37.9 |
| 519847 | 4/1940 | United Kingdom | 224/282 |
| 2060761 | 5/1981 | United Kingdom | 292/251.5 |

Primary Examiner—Henry J. Recla
Assistant Examiner—Edward C. Donovan
Attorney, Agent, or Firm—Schwartz & Weinrieb

[57] ABSTRACT

A locking system defined between a stationary support housing defining an interior space to be closed by a closure, and a closure movably mounted upon the stationary support housing between an open, unlocked position and a closed, locked position, includes first and second cams fixedly mounted upon the closure, and a rotatable control element rotatably mounted upon the stationary support housing. When the closure (10) is disposed in its closed, locked position within the stationary support housing (11), the first cam (32) is engaged with a first end (27) of the rotatable control element (25). In order to move the closure (10) to its open, unlocked position, the closure (10) is initially pivoted inwardly of the housing (11) such that the first cam (32) is disengaged from the first end (27) of the control element (25) and the second cam (31) engages a second end portion (29) of the control element (25) so as to initially rotate the control element out of its initial angular orientation at which the control element (25) cooperates with the first cam (32) in the locked position. Pivoted movement of the closure (10) toward the open, unlocked position causes the first cam (32) to rotate the control element (25) further toward a second angular orientation as the first cam (32) passes by the control element (25) as the closure (10) achieves the open, unlocked position. Pivoted movement of the closure (10) back toward its closed, locked position causes the second cam (31) to engage the first end portion of the control element (25) as the closure (10) is pivoted inwardly of the housing (11) beyond the closed, locked position so as to rotate the control element (25) to its second angular orientation. Release of the closure (10) so as to permit the same to pivot a predetermined amount back outwardly toward the open, unlocked position causes engagement of the first cam (32) with a second end (28) of the control element (25) whereby the closure (10) is again disposed at its closed, locked position.

20 Claims, 2 Drawing Sheets

LOCKING MECHANISM FOR A PIVOTABLE CLOSURE

FIELD OF THE INVENTION

The present invention relates to a locking means or system for a flap or closure closing a hollow space or the like which is supported for pivotal movement about an axis defined within a stationary support housing defining the hollow space or the like therewithin.

BACKGROUND OF THE INVENTION

German patent application P 36 21 259.8 deals with a locking system which is similar to that of the present invention. A flap, a lid or the like is provided with a fixed locking bolt which cooperates with a latch. The latch is formed as a bail, overlapping the locking bolt in the closed position. The latch is pivotally linked to a slide disposed within a box-like guiding means which is open to one side thereof. If the slide is substantially wholly disposed within the guiding means the latch is disposed in its locking state. If the slide is disposed partially out of the guiding means, the latch may be moved into its unlocking state by exerting a force upon the locking bolt. The slide has a control element which is supported by the slide for rotation about an axis disposed transverse to the moving direction of the slide. The control element cooperates with fixedly attached cam means of the guiding means such that the control element cooperates with first cam means in the closing position by means of which the slide is held at the lower or locking position and prevented from underdoing movement outwardly of the guiding means. Upon movement of the slide into the guiding means, the control element is released from the first cam means and cooperates with second cam means which rotates the control element about its axis. If, thereafter, the slide is release a spring continuously biasing the slide urges the slide outwardly of the guide means, with the control element now passing the second cam means. As a result, the control element is rotated further. If, conversely, the slide is moved from the opened position to the closed position the second cam means moves the control element to a position at which it again cooperates with the first cam means in order to retain the slide in the locking position.

Such a locking system enables the opening and closing of a lid, a flap or the like only by exclusive actuation of the flap or the lid without necessitating the actuation of a locking element, a handle or the like. However, it requires a number of parts and needs a predetermined amount of space which is not always available.

OBJECT OF THE INVENTION

It is an object of the invention to provide a locking means for a flap closing a hollow space or the like which is constructed of parts made of plastic material, can be simply manufactured and assembled, and which needs only a minimum amount of space to be operational.

SUMMARY OF THE INVENTION

This object is attained by the features according to the present invention wherein a lid, a flap or a similar element normally serves to close a hollow space. In accordance with the locking means according to the invention, the control element is rotatably supported upon a wall of the housing defining the hollow space which extends perpendicularly to the pivoting or hinge axis of the flap. The flap includes an angled portion which in the closed position of the flap is disposed within the hollow space so as to extend parallel to the hollow space wall supporting the control element. Two cam means are located upon the surface of the angled portion or sidewall of the closure facing the control element, the cam means projecting outwardly from the angled portion and cooperating with the control element. Spring means directly engage the flap so as to bias the same toward the opening direction.

The locking means according to the invention only requires a predetermined amount of space which is determined by means of the thickness of the control element and the cam means, respectively. This space can be a relatively narrow gap defined between the angled portion of the closure and the hollow space wall. No projecting or disturbing parts are to be located within the hollow space.

In the locking means according to the invention, the control element not only serves to provide the locking function, but, in addition is a part of the locking means, that is, it cooperates with the cam means. In the closed position, the cooperation of the control element with the cam means prevents the flap from attaining the opened position, either automatically or by means of manual force, respectively. If, however, a force is impressed upon the flap—the flap is supported such that it is enabled to undergo movement beyond its closed or locking position—the first cam means is freed from the control element, and the second cam means rotates the control element through a predetermined angle so that upon releasing the flap, the control element is passed by means of the first cam means and is rotated further by engagement with the first cam means. Conversely, the second cam means rotates the control element through a predetermined angular amount in the same direction when the flap is moved toward the closing position. After the flap which has been moved a predetermined distance beyond the closing position, the first cam again means can lockingly cooperate with the control element. Both cam means, the control element and the spring means, thus, form the control and the locking mechanism as well, for the actuation and the locking and unlocking of the flap, a lid, or a similar constructional part.

According to an embodiment of the invention, raised abutment means are formed upon the hollow space wall against which the first cam means is engaged when the flap is disposed at its opened position. Alternatively, the second cam means can cooperate with the abutment means. As a result of such structure a simple opening limitation for the flap is provided.

If the body defining the hollow space and the flap are, for example, of plastic material the abutment means and the cam means are integrally formed therewith. The abutment means and first cam means, occasionally, may be mechanically stressed, particularly if the user is exerting an outward force upon the closure or is otherwise impressing a similar load thereon otherwise. A further mechanical stress may occur when the flap is removed. In the case of unskillful handling manipulation of the closure, the user may occasionally or inadvertently pull outwardly upon the flap or closure even after the latter has come into contact with the fixed abutment and, thus, may deform the cam means and the abutment. An alternative embodiment of the invention provides that the spring means is attached to the flap and includes a bent portion which engages an abutment surface of the interior wall of the housing defining the hollow space when the closure is disposed in the opened position. In this embodiment, the spring forms the opening limitation or stop in conjunction with an abutment defined within the surface of the interior wall of the housing defining the hollow space. As already mentioned, a spring is a necessary element of the locking system of the present invention. If a spring is mounted on the flap it can provide the limiting function.

The locking means according to the invention is particularly advantageous if it is applied to pivotally supported containers which are completely or partially received within the hollow space. This is the case with ash-trays mounted within automobiles or the like. In this embodiment, the flap is defined by means of the front wall of the container, and the angled flap portion is formed by a side wall of the container.

In connection with ash containers it is necessary operative function that they be capable of being removed. Ash-trays have to be emptied periodically. In this connection an embodiment of the invention provides that the container as known per se in its opened position is to be engaged or disengaged with a pivot mechanism for installing or removing purposes. An arculate or angled orientation portion is located upon the sioedwall of the container, which, upon pivoting of the container towards its closed position, rotates the control element to a predetermined rotational position, the second cam means rotating the control element to a further rotational position at which the first cam means can engage the control element. The locking of the container can only occur if the control element has a predetermined initial rotational position. The rotational position of the control element can sometimes be unintentionally changed as a result of the installation or the removal of the container, respectively, such that the desired actuation through the cam means cannot take place. By means of the orientation portion, the same insures that the control element, independent of an arbitrary rotational position, is to be brought to a defined rotational position so that cooperation of the cam means with the control element is achieved as described. According to a further embodiment of the invention, the orientation portion is a part of the first cam means.

It has already been mentioned that the spring means mounted upon the rear side of the container cooperates with the abutment means defined within the interior wall surface of the housing defining the hollow space. This abutment means, according to a further embodiment of the invention is formed by means of a rib defined within the interior wall surface of the housing defining in the hollow space.

The spring means which is preferably a leaf spring is, according to an embodiment of the invention, received within a downwardly open slot at the rear of the container. Preferably, the spring means is clampingly received within the slot. The free end thereof can be manually gripped when the closure is disposed in the opened position in order to release the spring from the abutment means. The container can thereafter be removed.

If the body forming the hollow space as well as the container is formed of plastic material it is additionally advantageous, according to an embodiment of the invention, to provide the hollow space with quarter circle ribs which engage the side walls of the container through means of notch-like recesses.

The container can be designed in accordance with alternative characteristics. An alternative embodiment of the invention provides that the container can be installed or removed by engagement or disengagement with or from the pivot as is known per se. Guiding means facing the control element are provided upon the hollow space wall, the guiding means terminating at a distance from the control element. A guiding portion is located upon the side wall of the container which slides along the guide means upon insertion of the container, the length of the guiding means being dimensioned such that the guiding portion can be moved through a gap defined between the guiding means and the control element so as to permit the container to become engaged with the pivot. As a result of this structure, the container is guided inserted or installed in the hollow space in order to simply properly engage when the trunnions, pivots, or the like. The guide means, at the same time, prevents the side wall of the container from striking the control element so as not to adversely affect the control element or the bearing thereof. In this connection it is additionally advantageous if the upper edge of at least one side wall of the container forms an automatic guide together with a correspondingly curved upper wall of the hollow space which guide prevents, upon insertion of the container within the hollow space or engagement thereof with the pivot, respectively, mechanical contact of the container with the control element from taking place. The guide portion which slides along the guide means of the hollow space wall can, additionally, be formed as an abutment which limits the movement of the flap or the container, respectively, into the hollow space beyond the locked or closed position.

BRIEF DESCRIPTION OF THE DRAWINGS

The invention is explained in detail in connection with several embodiments shown in the accompanying drawings; wherein.

DETAILED DESCRIPTION OF THE ILLUSTRATED EMBODIMENT

Figure 1:
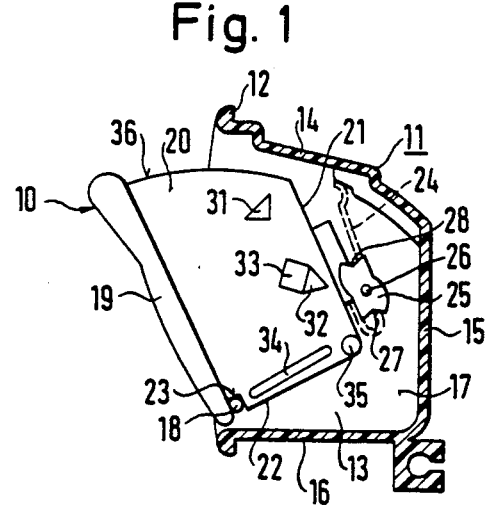
FIG. 1 shows a cross sectional view of an ash-tray for an automobile when the ash-tray is disposed in its opened position. wherein first and second cam 32 and 31 are fixedly mounted upon sidewalls of the ash-tray container 10, while an abutment or stop 33 is fixedly mounted upon an interior wall surface 17 of the ash-tray housing.

Before proceed with the details illustrated by the means of drawings it is to be noted that each of the described features per se, taken alone or in conjunction with the features of the claims is essential to the invention.

It is to be noted further that the drawings are extremely diagrammatical and are not presented in full scale.

An ash-tray 10 is received within a socket or housing 11. The socket 11 is an integral body of plastic material which is adapted to be mounted in a countersunk manner at a suitable place within an automobile such as, for example, within the dashboard, console, or the like, thereof. It includes a radial flange 12 which engages a cover or the like. No details are dealt with regarding the exterior design and the assembly of the socket 11 as such forms no part of the present invention.

A hollow space 13 is defined by means of the socket 11 which is formed by means of an upper wall 14, a rear wall 15, a bottom wall 16 and two parallel side walls, one of which is shown at 17.

The ash-tray 10 includes a front wall 19, two side walls, one of which is shown at 20, a rear wall 21 and a bottom wall 22. In the following consideration it is pretended that the side walls 20 of the ash-tray are transparent, the reference number 20 designating the distal side wall if viewed from the viewing point of reference.

A rod 18 interconnects the side walls 17 of the socket 11 within the lower front area thereof. It forms a bearing for the ash-tray, the bottom wall thereof including a notch-like recess 23 which is adapted to be mated with the rod 18. As a result, the ash-tray 10 can be freely pivoted about the axis of the rod 18 between a closed position according to FIG. 2 and an opened position according to FIG. 1. A leaf spring 24, which is mounted upon the rear surface of the rear wall 21, continuously biases the ash-tray towards the opened position. An elongated small plate 25 is supported upon at least one of the side walls 17 for rotation about an axis 26 and serves as a control element. The control element 25 is provided with notches 27, 28, respectively, at opposite ends thereof. Outwardly curved portions 29, 30 are formed along the longitudinal sides of the control element.

Two triangular cams 31, 32 are mounted upon the outer surface of at least one side wall 20 of the ash-tray 10. The cams 31, 32 are disposed within the same plane as control element 25 and cooperate with the control element as will be described hereinbelow.

A raised abutment 33 is formed upon the interior wall surface of the distal side wall 17 of the socket or housing 11 so as to be located at a position interposed between the open side of socket 11 and the control element 25. It is arranged such that the cam 32 engages the abutment 33 when the ash-tray 20 is disposed at its opened position and, thus, restricts the opening movement thereof. A raised guiding ledge 34 is formed upon the interior of the housing or socket 11 wall 17 surface of at least one of the side walls between the opening of socket 11 and the control element 25, the edge 34 extending obliquely upwardly towards the control element 25; the same however terminating at a distance therefrom. A projection 35 is formed upon at least one of the side walls 20 of ash-tray 10 so as to slide along the guide 34 upon insertion of the ash-tray 10 within the hollow space 13. Only when the projection 35 is moved through the gap defined between the guide 34 and the control element 25 can the ash-tray be brought into engagement with the rod 18 and thereafter pivoted thereon. It is understood that when this movement of the ash-tray 10 is being accomplished abutment 33 and cam 32 do not touch each other. If the rod 18 is received within the notch-like recess 23, further inward movement of the ash-tray 10 is prevented. Therefore, the control element 25 is not affected by any parts of the ash-tray when the ash-tray is installed. The side walls 20 of the ash-tray 10 are slightly curved at the upper edge portions thereof as shown at 36. Additionally, the top wall 14 of the housing socket 11 is formed upon the interior surface thereof such that it defines an automatic guide in conjunction with the curved edge portions 36, so that pivoting of the ash-tray 20, can occur only if the rod 18 is completely received within the recess 23.

Figure 2:
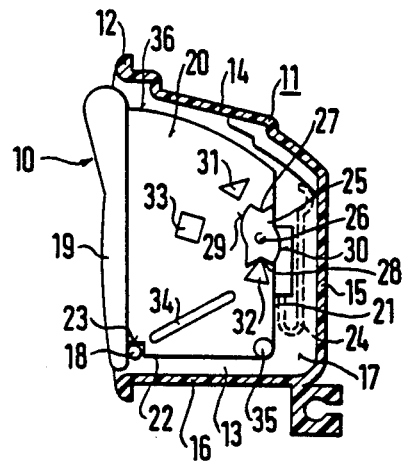
FIG. 2 shows the ash-tray according to FIG. 1 in its closed position.

When the ash-tray is disposed at the closed position according to FIG. 2, the lower cam 32 engages the notch 28 of the control element 25. In spite of the outward biasing effect of the spring upon the ash-tray 10, the ash-tray is lockingly received within the socket 11. An upward pulling force exerted upon the front wall 19 would not effect an opening of the ash-tray 20. For opening purposes, a force must be exerted against the front wall 19 by means which the ash-tray 10 is pivoted a small amount into the socket 11 in the clock-wise direction. This pivoting movement is restricted by means of the projection 35 which engages the bottom wall 16 of socket 11. Upon achieving this movement, the lower cam 32 is freed from notch 28. Additionally, the cam 31 cooperates with the curved portion 29 of the control element 25 and rotates the control element a predetermined amount in clock-wise direction. If, thereafter force upon, the ash-tray 10 is the release spring 24 urges the ash-tray in an the counter clock-wise direction. As a result of the changed rotational position of the control element 25, the control element 25, is rotated further in the clock-wise direction by means of cam 32 through, an angle of approximately 160°, as can be seen in FIG. 1 as the cam 32 moves from the position of FIG. 2 to that of FIG. 1 in accordance with the counterclockwise movement of the ash-tray 10. The opening of the ash-tray 10 is limited by the engagement of the lower cam 32 with the raised abutment 33. If the ash-tray is to be closed it is pressed into the socket 11 against the biasing force of the spring to a position beyond the normally closed and locked position. As a result of, the upper cam 31 rotates the control element 25 through an additional angular amount which leads to the position of the control element 25 shown in FIG. 2. Upon pivoting of the ash-tray 10 into the socket, the ash-tray 10 is pivoted beyond the position as shown in FIG. 2, such that the cam 32 again cooperates with the lower notch of the control element 25 after the release of the force upon front wall 19, thereby locking the ash-tray 10 in the position shown in FIG. 2.

As can be seen the control element 25 is rotated through an angle of 180° upon a single opening and re-closing mode of ash-tray 10. The portions of the control element 25 disposed upon different sides of the transverse axis are designed so as to be laterally reversed.

Figure 3:
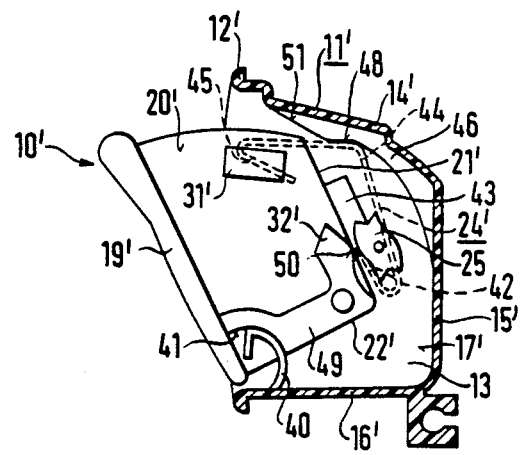
FIG. 3 is a cross section of a further embodiment of an ash-tray for an automobile when the ash-tray is disposed in its opened position.
Figure 4:
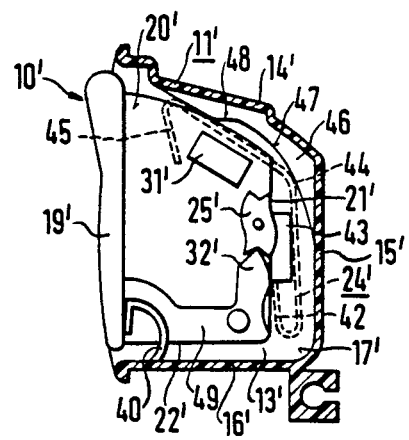
FIG. 4 shows the ash-tray according to FIG. 2 in its closed position.

As far as the embodiment according to FIGS. 3 and 4 which has equal parts with respect to the embodiment according to FIGS. 1 and 2, the same reference numbers are used, but although an apostrophe is added thereto.

The ash-tray 10' is received within a socket 11' which as an integrally formed body of plastic material is assembled in a countersunk mode at a suitable place within an automobile. The socket includes a radial flange 12' which is adapted to engage a cover plate or the like. A hollow space 13' is formed within the socket 11' which is bordered by means of an upper wall 14', a rear wall 15', a bottom wall 16' and two parallel side walls, one of which is shown at 17'.

The ash-tray 10' includes a front wall 19', two side walls, one of which is shown at 20', a rear wall 21' and a bottom wall 22'. Similar to the explanation or description accompanying FIGS. 1 and 2 it is pretended that the side walls 20' of the ash-tray are transparent, the reference number 20' designating the distal side wall if viewed from the viewing point of reference.

The side walls 17' of the socket 11' include two quarter-circle ribs, one of which is designated at 40. The ribs cooperate with a correspondingly formed recess 41 within each side wall 20' of the ash-tray 10'. As shown in FIG. 3, the ash-tray 10' is placed upon the ribs 40 and thereafter pivoted to its closed position. A leaf spring 24' has a hook-shaped free end 42 clampingly engaged within a slot of an extension 43 mounted upon the rear wall of the ash-tray 10. The portion following the hook-like end 42 of the leaf spring is disposed substantially parallel to the rear wall 21' of the ash-tray 10 and terminates in an intermediate bent portion 44. A hook-shaped bent portion 45 is formed upon the free end of the straight portion of the spring extending outwardly from the intermediate bent portion 44. A rib 46 is formed within the socket 11' at the top wall 14' and the rear wall 15' in so as to define a curve 47 which the bent serves as a guide for portion 44, as the ash-tray 10' is moved from the closed to the opened position and conversely. The open position is shown in FIG. 3 and limited by means of an abutment 48 of the rib 46, the bent portion 44 of the spring cooperating with the abutment 48. Only by pressing down the free end 45 of spring 24, can the bent portion 44 be freed from abutment 48 allowing an outward pivoting of the ash-tray 10'.

The recesses 41 are formed within a raised portion 49 formed upon the side walls 20'. The raised portion 49 forms a triangular cam 32'. A control curve can be seen defined below and upon the outer side of the cam 32' as shown at 50. The function of the control curve will be described later. The cams 31', 32' cooperate with the control element 25', the structure of control element 25' being similar to that of the embodiment according to FIGS. 1 and 2. Therefore, the shape of the cams are not described in detail.

Upon assembling of the ash-tray 10' within the socket 11' the recesses 41 are placed upon the ribs 40. Upon a pivoting of the ash-tray 10' to the closed position, the bent portion 44 is guided along the inclined plane 51 of rib 46 so that the bent portion 44 moves below the abutment 48 without necessitating the application of any substantial forces. As a result of this movement, the control curve 50 insures the fact that the control element 25, in any case, reaches the defined rotational position independent of the previous relative rotational position as shown in FIG. 3. If, thereafter, the ash-tray 10' is moved from the open position according to FIG. 3 to the closed position according to FIG. 4 the control element 25' is rotated by means of the cam 31' in the clock-wise direction as much as is necessary to achieve the engagement of the cam 32' with the lower notch of the control element 25'. This operation has already been described in connection with FIGS. 1 and 2. A re-opening of the ash-tray 10' takes place in the described manner.

Obviously, many modifications and variations of the present invention are possible in light of the above teachings. It is therefore to be understood that within the scope of the appended claims, the present invention may be practiced otherwise than as specifically described herein.

We claim:

1. A locking system defined between a stationary support housing defining an interior space to be closed by means of a closure, and a closure movably mounted upon said stationary support housing between an open, unlocked position, and a closed, locked position, comprising:

first cam means adapted to be fixedly mounted upon said closure;

rotatable control means adapted to be rotatably mounted upon said stationary support housing so as to be disposed at a first angular orientation whereby a first end portion thereof is engaged with said first cam means when said closure is disposed at said closed, locked position so as to lock said closure at said closed, locked position;

second cam means adapted to be fixedly mounted upon said closure in spaced relation with respect to said first cam means for engaging a second end portion of said rotatable control means for rotatably moving said rotatable control means from said first angular orientation, when a force is impressed upon said closure tending to move said closure inwardly within said stationary support housing and within said interior space thereof beyond said closed, locked position for releasing said engagement of said first cam means from said first end portion of said rotatable control means, toward a second angular orientation so as to permit further rotation of said rotatable control means toward said second angular orientation as a result of engagement of said first cam means with said rotatable control means during movement of said closure from said closed, locked position toward said open, unlocked position; and for engaging said first end portion of said rotatable control means in order to rotate said rotatable control means to said second angular orientation when said closure is moved from said open, unlocked position toward and beyond said closed, locked position so as to permit said first cam means to engage said second end portion of said rotatable control means and thereby lock said closure at said closed, locked position; and abutment means, fixedly mounted upon said support housing, for engaging said first cam means so as to limit the extent to which said closure is moved relative to said support housing when said closure is moved from said closed, locked position to said open, unlocked position, and for defining said open, unlocked position.

2. A locking system as set forth in claim 1 wherein:
said housing is adapted to be mounted within a motor vehicle; and
said closure is an ashtray.

3. A locking system as set forth in claim 1, further comprising:
means defined between said closure and said housing for pivotably mounting said closure upon said housing between said open, unlocked position and said closed, locked position.

4. A locking system as set forth in claim 1, further comprising:
spring means mounted upon said closure and interposed between said closure and said housing for biasing said closure toward said open, unlocked position.

5. A locking system as set forth in claim 4, further comprising:

abutment means defined upon said support housing for engaging said spring means mounted upon said closure so as to limit the extent to which said closure is moved relative to said support housing when said closure is moved from said closed, locked position to said open, unlocked position.

6. The locking system as set forth in claim 5, wherein:
said spring means comprises a bent leaf spring having one end thereof mounted upon said closure and a second free distal end thereof being disposed within the vicinity of an open mouth portion of said support housing so as to be manually accessible from a position exterior to said support housing in order to disengage said second free distal end portion of said spring means from said abutment means of said support housing whereby said closure can be removed from said support housing.

7. The locking system as set forth in claim 1, further comprising:
means fixedly mounted upon said closure for engagement with said support housing for limiting the inward movement of said closure beyond said closed, locked position.

8. A locking system as set forth in claim 1, wherein:
said rotatable control means comprises an oblong-configured plate having notch means defined within said first and second end portions thereof for engagment with said first cam means when said closure is disposed at said closed, locked position.

9. A locking system as set forth in claim 8, wherein:
at least said first cam means has a triangular configuration such that a vertex portion of said triangular cam means engages said notch means of said rotatable control means when said closure is disposed at said closed, locked position.

10. A locking system as set forth in claim 1, wherein:
at least said first cam means has a triangular configuration; and
said abutment means has a substantially square-shaped configuration such that when said closure is moved to said open, unlocked position, one side surface of said triangularly configured first cam means engages one side surface of said substantially square-shaped abutment means.

11. In combination, a locking system, comprising:
a stationary support housing defining an interior space;
a closure movably mounted upon said stationary support housing into and out of said interior space between closed, locked and open, unlocked positions, respectively;
first cam means fixedly mounted upon said closure;
rotatable control means rotatably mounted upon said stationary support housing so as to be disposed at a first angular orientation whereby a first end portion thereof is engaged with said first cam means when said closure is disposed at said closed, locked position so as to lock said closure at said closed, locked position;
second cam means fixedly mounted upon said closure in spaced relation with respect to said first cam means for engaging a second end portion of said rotatable control means for rotatably moving said rotatable control means from said first angular orientatin, when a force is impressed upon said closure tending to move said closure inwardly within said stationary support housing and within said interior space thereof beyond said closed, locked position for releasing said engagement of said first cam means from said said first end portion of said rotatable control means, toward a second angular orientation so as to permit further rotation of said rotatable control means toward said second angular orientation as a result of engagement of said first cam means with said rotatable control means during movement of said closure from said closed, locked position toward said open, unlocked position; and for engaging said first end portion of said rotatable control means in order to rotate said rotatable control means to said second angular orientation when said closure is moved from said open, unlocked position toward and beyond said closed, locked position so as to permit said first cam means to engage said second end portion of said rotatable control means and thereby lock said closure at said closed, locked position; and
abutment means, fixedly mounted upon said support housing, for engaging said first cam means so as to limit the extent to which said closure is moved relative to said support housing when said closure is moved from said closed, locked position to said open, unlocked position, and for defining said open, unlocked position.

12. The combination as set forth in claim 11, wherein:
said housing is adapted to be mounted within a motor vehicle; and
said closure is an ashtray.

13. The combination as set forth in claim 11, further comprising:
means defined between said closure and said housing for pivotably mounting said closure upon said housing between said open, unlocked position and said closed, locked position.

14. The combination as set forth in claim 11, further comprising:
spring means mounted upon said closure and interposed between said closure and said housing for biasing said closure toward said open, unlocked position.

15. The combination as set forth in claim 14, further comprising:
abutment means defined upon said support housing for engaging said spring means mounted upon said closure so as to limit the extent to which said closure is moved relative to said support housing when said closure is moved from said closed, locked position to said open, unlocked position.

16. The combination as set forth in claim 15, wherein:
said spring means comprises a bent lead spring having one end thereof mounted upon said closure and a second free distal end thereof disposed within the vicinity of an open mouth portion of said support housing so as to be manually accessible from a position exterior to said support housing in order to disengage said spring means from said abutment means of said support housing when said closure is disposed within the vicinity of said open, unlocked position whereby said closure can be removed from said support housing.

17. The combination as set forth in claim 11, further comprising:
means fixedly mounted upon said closure for engagement with said support housing for limiting the inward movement of said closure beyond said closed, locked position.

18. The combination as set forth in claim 11, wherein:

said rotatable control means comprises an oblong-configured plate having notch means defined within said first and second end portions thereof for engagement with said first cam means when said closure is disposed at said closed, locked position.

19. The combination as set forth in claim 18, wherein:
at least said first cam means has a triangular configuration such that a vertex portion of said triangular cam means engages said notch means of said rotatable control means when said closure is disposed at said closed, locked position.

20. The combination as set forth in claim 11, wherein:
at least said first cam means has a triangular configuration; and
said abutment means has a substantially square-shaped configuration such that when said closure is moved to said open, unlocked position, one side surface of said triangularly configured first cam means engages one side surface of said substantially square-shaped abutment means.

* * * * *